T. J. LINDSAY.
TWIN WHEEL.
APPLICATION FILED MAY 18, 1916.
1,216,474.
Patented Feb. 20, 1917.
3 SHEETS—SHEET 2.
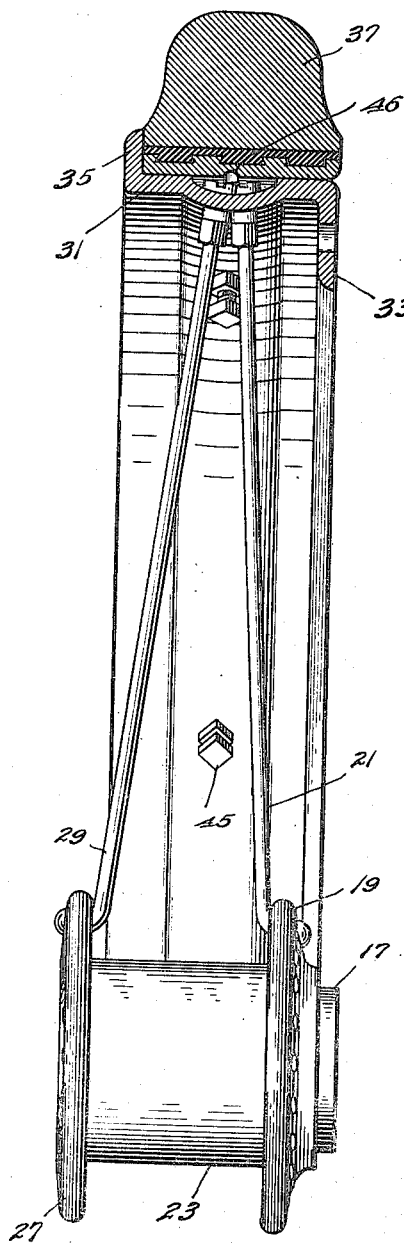
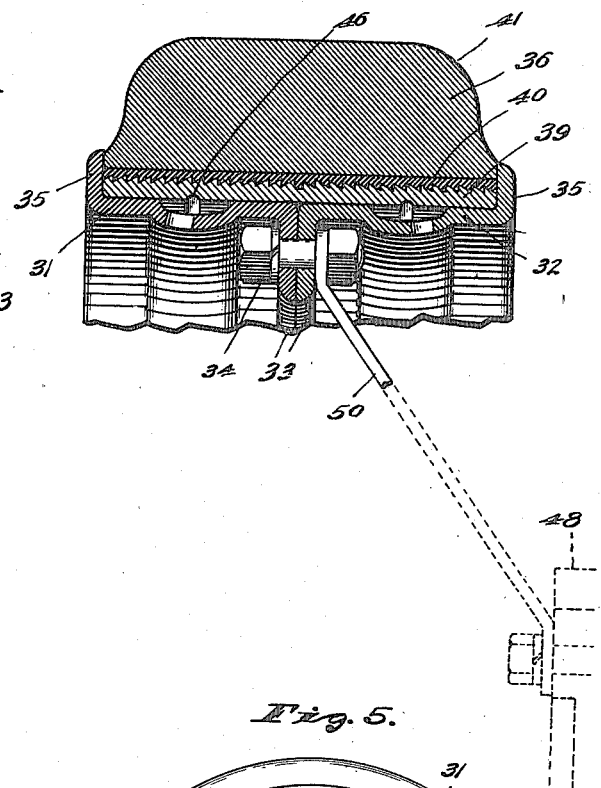
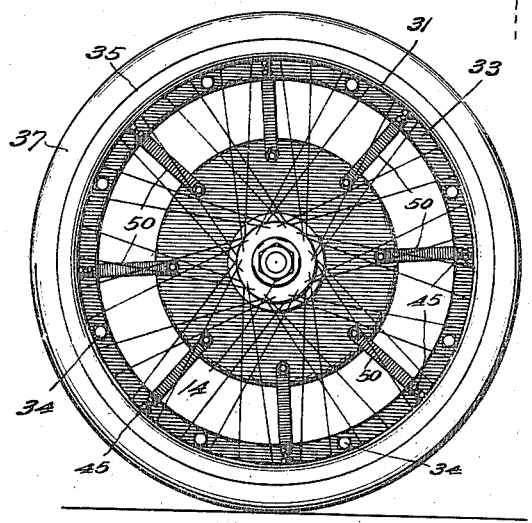
WITNESSES:
Frank A. Fable
Josephine Gasper
INVENTOR
Thomas J. Lindsay,
BY
Hood & Schley.
ATTORNEYS

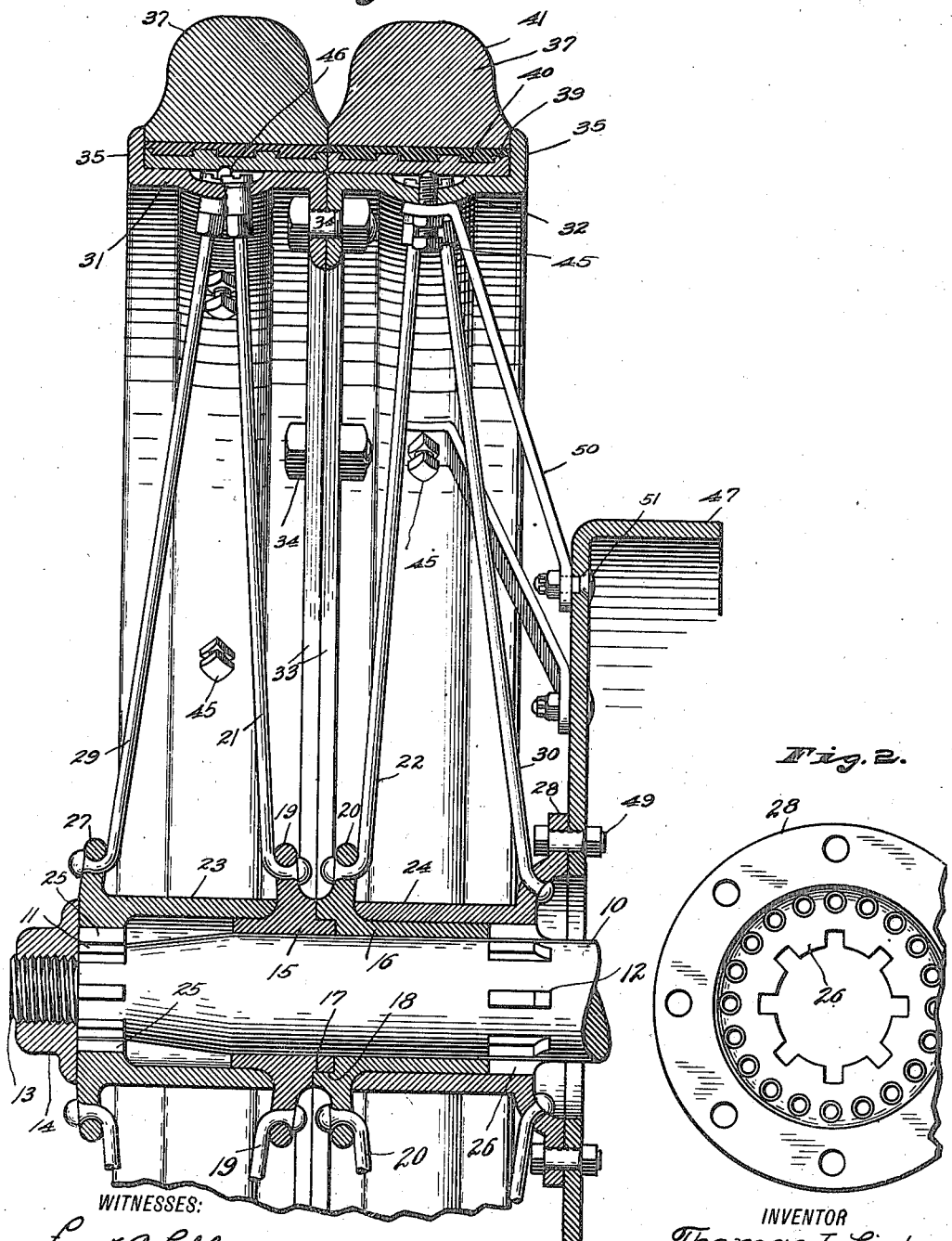

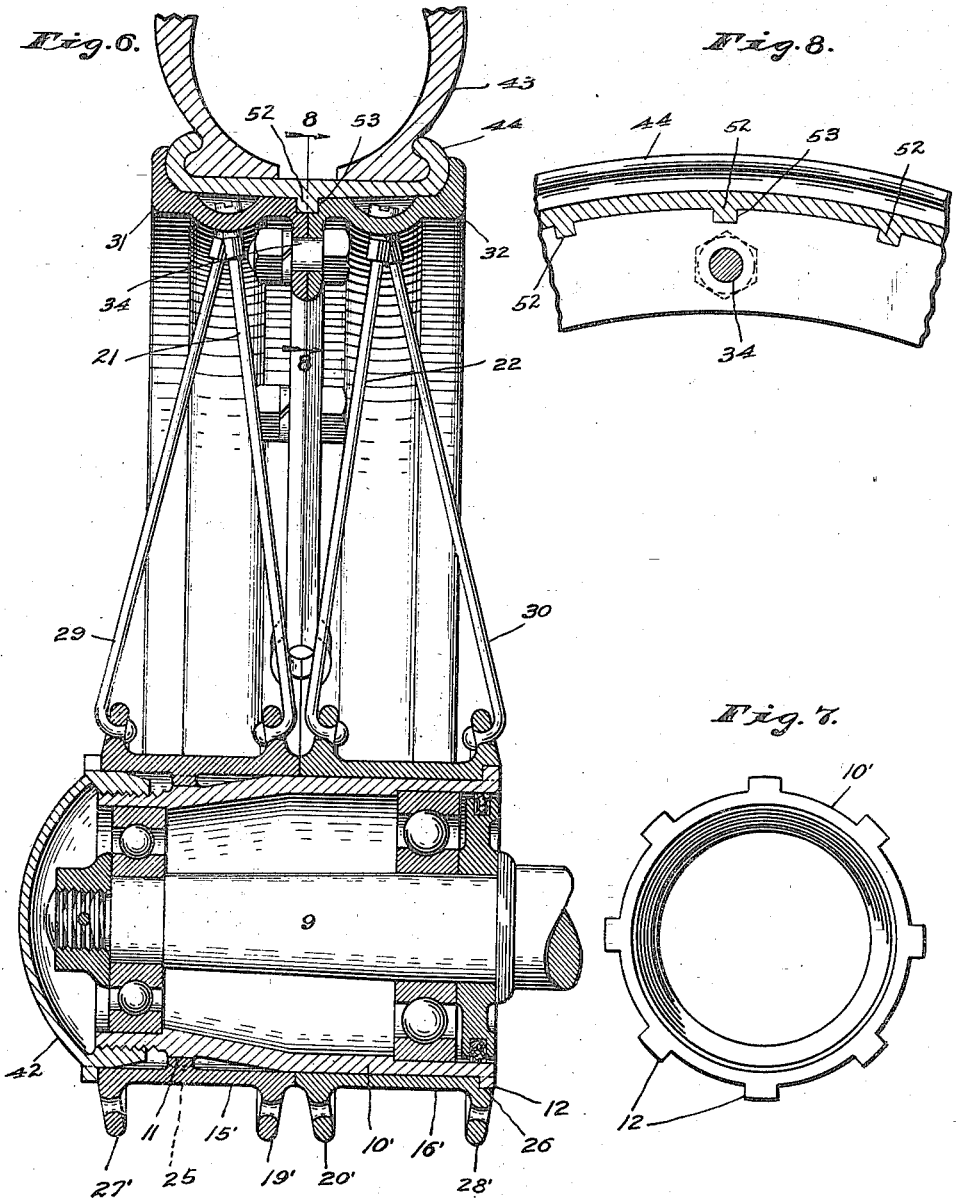

UNITED STATES PATENT OFFICE.

THOMAS J. LINDSAY, OF INDIANAPOLIS, INDIANA.

TWIN WHEEL.

1,216,474.  Specification of Letters Patent.  Patented Feb. 20, 1917.

Application filed May 18, 1916. Serial No. 98,238.

*To all whom it may concern:*

Be it known that I, THOMAS J. LINDSAY, a citizen of the United States, residing at Indianapolis, in the county of Marion and State of Indiana, have invented a new and useful Twin Wheel, of which the following is a specification.

It is the object of my invention to produce a wheel construction whereby the tire or tires, especially solid tires, may be demounted easily and quickly, without the use of special apparatus, and when in place are firmly held against slipping; in which the wheel is axially sectional, to form a twin wheel, may be demounted either in sections or as a unit, the sections are firmly held against relative movement, and the driving or braking force is efficiently transmitted to or from the wheel rim from or to a central member, such as the driving shaft, and from or to the driving sprocket or the brake drum; in which the separation of the sections of the wheel permits the demounting and replacing of the tire or tires, and the clamping together of the wheel sections locks the tire or tires in place; and in which the necessary resiliency may be obtained with solid tires by the use of tangential wire spokes. My invention relates particularly to twin wire wheels, especially with solid tires, for commercial vehicles.

The accompanying drawings illustrate my invention. Figure 1 is a central axial section through a twin wire traction wheel embodying my invention, with twin solid tires mounted on the wheel rim; Fig. 2 is an elevation of the inner end of the outer sleeve of the inner section of the hub of such wheel; Fig. 3 is an edge elevation of the outer section of the wheel shown in Fig. 1, with the rim and tire in section as in Fig. 1; Fig. 4 is a section through the wheel rim, showing a single solid tire thereon; Fig. 5 is a side elevation of the wheel shown in Fig. 1; Fig. 6 is a section, similar to Fig. 1, through another form of twin wire wheel embodying my invention; Fig. 7 is an elevation of the inner end of the central supporting sleeve on which the wheel of Fig. 6 is mounted; and Fig. 8 is a fragmentary section on the line 8—8 of Fig. 6.

Two somewhat different forms of wheels embodying my invention are shown in Figs. 1 to 4 inclusive and in Figs. 6 to 8 inclusive, and these two forms will be described separately.

In the form shown in Figs. 1 to 4 inclusive, there is a central driving shaft or axle 10, which is ensmalled at the outer end, and is provided with two outwardly projecting series of teeth 11 and 12 near the end of the shaft on the ensmalled part and at some distance from the end on the larger part respectively, and with a screw-threaded portion 13 beyond the teeth 11 for receiving a clamping nut 14. The outer ends of the teeth 11 lie within the circumference of the larger part of the shaft 10, so that the wheel hub, which is made in two axial sections, may be slipped over the teeth 11 on to and off the larger portion of the shaft 10. Each hub section comprises two telescoping sleeves. The inner sleeves 15 and 16 of the two hub sections interfit on an annular shoulder 17 projecting from one of them—here the sleeve 15—into a corresponding annular recess 18 in the end of the other—here the sleeve 16—and the two sleeves 15 and 16 abut against each other and the sleeve 16 abuts against the teeth 12, so that such teeth form a stop or abutment for the sleeves. The outer sleeves 23 and 24 of the two hub sections abut against outwardly projecting flanges 19 and 20 at the adjacent ends of the inner sleeves 15 and 16, and are provided with inwardly projecting teeth 25 and 26 which interlock with the teeth 11 and 12 on the shaft 10. If desired, one of the sets of teeth 11 and 12 on the shaft and its coöperating set of teeth on the hub section may be omitted so that only one hub section is interlocked with the shaft—in which case, I prefer to retain the teeth 12 and 26, so that it is the inner hub section which is thus interlocked. The outer hub sections 23 and 24 are provided at their remote ends with outwardly projecting flanges 27 and 28.

Wire spokes 21 and 22 connect the flanges 19 and 20 respectively, and wire spokes 29 and 30 connect the flanges 27 and 28 respectively, to two rim sections 31 and 32. These wire spokes extend at angles to the radii passing through their outer ends, some on one side and some on the other side of such radii, so as to produce opposing tangential components; and the spokes 21 and 29 and the spokes 22 and 30 project at opposite angles to the planes in which their outer ends lie, so as to produce opposing axial components. By reason of these various opposing forces, the two wheel sections, each comprising a hub section and a rim section connected by wire spokes, is self-contained, and the two sleeves comprising each hub section are interlocked against relative movement.

The two wheel sections are suitably fastened together so as to form a unitary whole. In the preferred form of my invention this fastening is provided by inwardly projecting annular flanges 33 at the adjacent ends of the two rim sections 31 and 32, and clamping bolts 34 passing through such flanges 33 to clamp them together. These clamping bolts 34 also clamp the tire or tires in place on the rim sections. For this purpose, the rim sections at their remote ends are provided with outwardly projecting flanges 35, for bearing against the remote side faces of a tire 36 (Fig. 4) or twin tires 37 (Figs. 1 and 3), so that by the tightening up of the clamping bolts 34 the tire or tires are clamped rigidly between the flanges 35 and thus held in place. This clamping action is entirely sufficient to hold the tire or tires rigid with the rim sections and prevent relative turning. The tire or tires are of any desired type, two standard forms of solid tires being shown in Figs. 1 and 4 respectively. Each of these standard tires has an inner metal section 39 suitably interlocked with an intermediate rubber section 40 on which is suitably fixed the tire tread or body 41.

In the form of wheel shown in Figs. 6 to 8 inclusive, the central supporting member, instead of being a solid shaft or axle as in the form shown in Fig. 1, is a sleeve 10', on which the two hub sections are mounted, which sleeve is suitably supported, as on ball bearings, on a spindle 9. The two hub sections, however, instead of being made of two telescoping sleeves as in Fig. 1, have but a single sleeve 15' and 16' each, which carry the outwardly projecting spoke flanges 19' and 27', and 20' and 28', respectively. The hub sections 15' and 16' are interlocked with the central supporting member 10' by coöperating teeth 11 and 25, and 12 and 26, as in the form shown in Fig. 1, though if desired only the teeth 12 and 26 may be used; and the circle forming the outer ends of the teeth 11, if such teeth are used, is sufficiently small to allow the passage of the hub sections 15' and 16' thereover. The sleeve 10', like the shaft 10, is ensmalled at its outer end, this time to receive a hub cap 42, the periphery of which may serve as a support for the outer end of the outer hub section 15'. The rim sections 31 and 32 are connected to the outwardly projecting flanges 19' and 27', and 20' and 28', respectively, by spokes 21, 22, 29, and 30, exactly as in the form shown in Fig. 1; and are provided at their adjacent edges with inwardly projecting flanges 33 and at their remote edges with outwardly projecting flanges 35, so that by the action of the clamping bolts 34 on such flanges 33 the tire, which in this case is shown as a pneumatic tire 43 mounted on a clencher rim 44, may be clamped rigidly in place on the rim sections.

In order to demount the tire or tires, the nut 14 or dust cap 42 is taken off and the bolts 34 are removed, and the entire outer wheel section, comprising the outer hub section, whether composed of the two sleeves 15 and 16 as in the form shown in Fig. 1 or the single sleeve 15' as in the form shown in Fig. 6, the outer rim section, and the interconnecting wire spokes, is removed. Then the tire or tires may be slipped off the rim section ends which are normally adjacent, and new tires placed thereon if desired. Because the clamping of the tires is between the flanges 35 and the remote faces of the tire or tires, there may be an easy fit between the inside face of the tire or its metal supporting ring 39 or 44 and the outer face of the rim sections 31 and 32, so that the tire or tires may be slipped on or off manually, instead of requiring hydraulic presses such as now required for mounting and demounting certain forms of tires. By removing only the nut 14 or dust cap 42, leaving the nuts 34 in place, the wheel may be demounted or replaced as a unit.

If desired, the outer faces of the rim sections 31 and 32 may be cylindrical, to coöperate with correspondingly cylindrical inner faces of the metal rings 39 or 44; and in this case clamping screws 45 may be provided in the rims 31 and 32 for projecting outwardly therethrough and into engagement with the inner faces of such metal rings, as shown in Fig. 1. However, I prefer to make the outer faces of the rims 31 and 32 slightly tapering, and smaller toward their adjacent ends, making the metal rings 39 or 44 correspondingly tapered, and smaller toward the middle, so that by the coöperation of these tapered surfaces a further clamping action of the tires on the rim section is obtained, as shown in Fig. 6. I may also provide one or more lugs 52 on the inner surface of the rim 39 or 44, to project into recesses 53 formed in the outer faces of the rim sections 31 and 32 at their adjacent ends.

When desired, a circular power-transmitting member, such as a brake drum 47 (Fig. 1) or a driving sprocket 48 (dotted lines in Fig. 4), may be mounted by bolts 49 on the flange 28 of the outer hub section. The driving or braking force is transmitted from or two such driving sprocket or brake drum through the flange 28, and therefrom through the spokes 30, and if the teeth 11 are used also through the shaft 10, the outer hub section, and the spokes 29, to or from the rim. If desired, the sprocket wheel or brake drum may be connected directly to the rim, as by tension strips 50 which are fastened to the sprocket wheel or brake drum by bolts 51 and may be fastened to the rim by either the lock nuts 54 on the screws 45 (Fig. 1) or by the bolts 34 (Fig. 4).

I claim as my invention:

1. A twin wire wheel, comprising a pair of hub sections, a pair of rim sections, wire spokes interconnecting the hub sections with the respective rim sections, thus forming two separable wheel sections, said rim sections at their remote ends having outwardly projecting flanges, a tire mounted on said rim sections and between said outwardly projecting flanges, and means for fastening said wheel sections together so as to clamp said tire between said outwardly projecting flanges.

2. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, said rim sections at their remote ends having outwardly projecting flanges, a tire mounted on said rim sections and between said outwardly projecting flanges, and means for fastening said wheel sections together so as to clamp said tire between said outwardly projecting flanges.

3. A twin wire wheel, comprising a pair of hub sections, a pair of rim sections, wire spokes interconnecting the hub sections with the respective rim sections, thus forming two separable wheel sections, said rim sections at their remote ends having outwardly projecting flanges, a tire mounted on said rim sections and between said outwardly projecting flanges, said rim sections at their adjacent ends having inwardly projecting flanges, and bolts for fastening together said inwardly projecting flanges to clamp said tire between said outwardly projecting flanges.

4. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, said rim sections at their remote ends having outwardly projecting flanges, a tire mounted on said rim sections and between said outwardly projecting flanges, said rim sections at their adjacent ends having inwardly projecting flanges, and bolts for fastening together said inwardly projecting flanges to clamp said tire between said outwardly projecting flanges.

5. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, said rim sections at their remote ends having outwardly projecting flanges, a tire mounted on said rim sections and between said outwardly projecting flanges, means for fastening said wheel sections together so as to clamp said tire between said outwardly projecting flanges, and a central supporting member, said central supporting member and a hub section having interfitting portions to prevent relative turning.

6. A twin wheel, comprising a pair of hub sections, a pair of rim sections, means interconnecting the hub sections with the respective rim sections, said rim sections at their remote ends having outwardly projecting flanges, a tire mounted on said rim sections and between said outwardly projecting flanges, a circular power-transmitting member mounted on one of said hub sections, and a direct connection from said power-transmitting member to one of said rim sections.

7. A wheel, comprising a central member having outwardly projecting teeth, a sleeve mounted on said central member, a second sleeve mounted on said first sleeve and having inwardly projecting teeth which interlock with the teeth on the central member, a circular power-transmitting member mounted on said second sleeve, a wheel rim, and wire spokes interconnecting said wheel rim with both said sleeves.

8. A twin wheel, comprising two inner sleeves, two outer sleeves respectively telescoped on said inner sleeves, said inner and outer sleeves both having flanges, two rim sections, and wire spokes connecting each of said rim sections with flanges on both an inner sleeve and the outer sleeve telescoped thereon, so as to form two wheel sections each including an inner and an outer sleeve and a rim section interconnected by wire spokes, and means for clamping the two wheel sections together.

9. A wheel, comprising a central member having outwardly projecting teeth, a sleeve mounted on said central member, a second sleeve mounted on said first sleeve, one of said sleeves having teeth which interlock with the teeth on the central member, a wheel rim, wire spokes interconnecting said wheel rim with both said sleeves, and a circular power-transmitting member directly interlocked with one of said sleeves.

10. A twin wheel, comprising two inner sleeves, two outer sleeves respectively telescoped on said inner sleeves, two rim sections, and wire spokes connecting each of said rim sections with both an inner sleeve and the outer sleeve telescoped thereon, so as to form two wheel sections each including an inner and an outer sleeve and a rim section interconnected by wire spokes, and means for clamping the two wheel sections together.

11. A twin wheel, comprising two inner sleeves, two outer sleeves respectively telescoped on said inner sleeves, two rim sections, and wire spokes connecting each of said rim sections, with both an inner sleeve and the outer sleeve telescoped thereon, so as to form two wheel sections each including an inner and an outer sleeve and a rim section interconnected by wire spokes, and means for clamping the two wheel sections together, in combination with a central member which interlocks with an outer sleeve to prevent relative rotation between said outer sleeve and central member.

12. A twin wheel, comprising two inner sleeves, two outer sleeves respectively telescoped on said inner sleeves, two rim sections, and wire spokes connecting each of said rim sections with both an inner sleeve and the outer sleeve telescoped thereon, so as to form two wheel sections each including an inner and an outer sleeve and a rim section interconnected by wire spokes, and means for clamping the two wheel sections together, in combination with a central member which interlocks with a sleeve to prevent relative rotation between said sleeve and central member.

13. A twin wheel, comprising two inner sleeves, two outer sleeves respectively telescoped on said inner sleeves, two rim sections, and wire spokes connecting each of said rim sections with both an inner sleeve and the outer sleeve telescoped thereon, so as to form two wheel sections each including an inner and an outer sleeve and a rim section interconnected by wire spokes, and means for clamping the two wheel sections together, said rim sections having outwardly projecting flanges, and a tire which is mounted on said rim sections and clamped between said flanges by the operation of said clamping means.

14. A wheel, comprising an inner sleeve, an outer sleeve telescoped thereon, a rim, wire spokes interconnecting said rim with both said sleeves, a circular power-transmitting member mounted on one of said sleeves, and a direct connection from said power-transmitting member to said rim.

15. A twin wheel, comprising two inner sleeves, two outer sleeves respectively telescoped on said inner sleeves, two rim sections, and wire spokes connecting each of said rim sections with both an inner sleeve and the outer sleeve telescoped thereon, so as to form two wheel sections each including an inner and an outer sleeve and a rim section interconnected by wire spokes, means for clamping the two wheel sections together, a circular power-transmitting member mounted on one of said sleeves, and a direct connection from said power-transmitting member to a rim section.

16. A twin wire wheel, comprising a pair of hub sections, a pair of rim sections, wire spokes interconnecting the hub sections with the respective rim sections, means for fastening said rim sections together, whereby a wheel comprising two sections, each comprising a hub section and a rim section and interconnecting wire spokes, is formed, a tread member mounted on said two rim sections jointly, and a central supporting member interlocked with a hub section to prevent relative turning between them.

17. A twin wire wheel, comprising a pair of hub sections, a pair of rim sections, two sets of wire spokes interconnecting the hub sections with the respective rim sections, means for fastening together the two wheel sections thus formed, whereby a wheel comprising two separable sections, each comprising a hub section and a rim section and interconnecting wire spokes, is formed, a tread member mounted on the two rim sections jointly, and a central supporting member interlocked with a hub section to prevent relative turning between them, said fastening means being independent of said central supporting member.

18. A twin wire wheel, comprising a pair of hub sections, a pair of rim sections, wire spokes interconnecting the hub sections with the respective rim sections, thus forming two separable wheel sections, means for fastening said wheel sections together, and a tire rim detachably mounted on said two rim sections, said tire rim and said rim sections having coöperating parts by which said tire rim is locked in place on said two rim sections when the two wheel sections are fastened together.

19. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, means for fastening said wheel sections together, and a tire firmly clamped in place on said two rim sections when the two wheel sections are fastened together and removable therefrom upon the separation of said wheel sections.

20. A twin wire wheel, comprising a pair of hub sections, a pair of rim sections, wire spokes interconnecting the hub sections with the respective rim sections, thus forming two separable wheel sections, said rim sections at their adjacent ends having inwardly projecting flanges, bolts for fastening together said inwardly projecting flanges, and a tire rim detachably mounted on said two rim sections, said tire rim and said rim sections having coöperating parts by which said tire rim is locked in place on said two rim sections when the two wheel sections are bolted together.

21. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, said rim sections at their adjacent ends having inwardly projecting flanges, bolts for fastening together said inwardly projecting flanges, and a tire firmly clamped in place on said two rim sections when the two wheel sections are bolted together and removable therefrom upon the separation of said wheel sections.

22. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, means for fastening said wheel sections together, a central supporting member, said central supporting member and a hub section having interfitting portions to prevent relative turning, and a tire firmly clamped in place on said two rim sections when the two wheel sections are fastened together and removable therefrom upon the separation of said wheel sections.

23. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, a circular power-transmitting member mounted on one of said hub sections, a direct connection from said power-transmitting member to one of said rim sections, and a tire firmly clamped in place on said two rim sections when the two wheel sections are fastened together and removable therefrom upon the separation of said wheel sections.

24. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, means for fastening said rim sections together, a tread member mounted on said two rim sections jointly, and a central supporting member on which said two hub sections are detachably mounted.

25. A twin wire wheel, comprising a pair of hub sections, a pair of rim sections, two sets of wire spokes connecting each hub section to the corresponding rim section and oppositely oblique to the wheel axis, thus forming two separable and self-supporting wheel sections each braced against thrust in both directions, means for fastening said wheel sections together, and a tire firmly clamped in place on said two rim sections when the two wheel sections are fastened together and removable therefrom upon the separation of said wheel sections.

26. A twin wire wheel, comprising a pair of hub sections, a pair of rim sections, two sets of wire spokes connecting each hub section to the corresponding rim section and oppositely oblique to the wheel axis, thus forming two separable and self-supporting wheel sections each braced against thrust in both directions, means for fastening said wheel sections together, and a tire rim detachably mounted on said rim sections, said rim sections having their outer surfaces smaller toward their adjacent ends and said tire rim having its inner surface correspondingly smaller at the middle and larger toward the ends so that the tire rim is locked in place when the wheel sections are fastened together and is detachable when they are separated.

27. A twin wire wheel, comprising a pair of hub sections, a pair of rim sections, two sets of wire spokes connecting each hub section to the corresponding rim section and oppositely oblique to the wheel axis, thus forming two separable and self-supporting wheel sections each braced against thrust in both directions, means for fastening said wheel sections together, and a tire rim detachably mounted on said rim sections, the outer surfaces of said rim sections being oppositely conical with their smaller portions at their adjacent ends and the inner surface of the tire rim having two correspondingly oppositely conical portions with their larger portions at the ends so that the tire rim is locked in place when the wheel sections are fastened together and is detachable when they are separated.

28. A twin wheel comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, means for fastening the two rim sections together and a tire firmly clamped in place on said two rim sections when said two wheel sections are fastened together and removable therefrom upon the separation of said wheel sections.

29. A twin wheel comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, a tire firmly clamped in place on said two rim sections when the two wheel sections are fastened together and removable therefrom upon the separation of said wheel sections, and a central supporting member on which said two hub sections are detachably mounted.

30. A twin wheel comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, and a tire rim detachably mounted on said rim sections, said tire rim having inwardly projecting members for locking it against relative rotation on the rim sections when the wheel sections are fastened together.

31. A twin wheel, comprising two inner sleeves, two outer sleeves respectively telescoped on said inner sleeves, two rim sections, and wire spokes connecting each of said rim sections with both an inner sleeve and the outer sleeve telescoped thereon, so as to form two wheel sections each including an inner and an outer sleeve and a rim section interconnected by wire spokes, means for clamping the two wheel sections together, and a tire firmly clamped in place on said two rim sections when the two wheel sections are clamped together and removable therefrom upon the separation of said wheel sections.

32. A twin wheel, comprising two inner sleeves, two outer sleeves respectively telescoped on said inner sleeves, two rim sections, and wire spokes connecting each of said rim sections with both an inner sleeve and the outer sleeve telescoped thereon, so as to form two wheel sections each including an inner and an outer sleeve and a rim section interconnected by wire spokes, means for clamping the two wheel sections together, and a tire rim firmly clamped in place on said two rim sections when the two wheel sections are clamped together and removable therefrom upon the separation of said wheel sections, said tire rim and said rim sections having interlocking parts which prevent relative movement between them when the wheel sections are clamped together.

33. A twin wheel, comprising two pairs of hub sections, a pair of rim sections, means interconnecting each rim section with both sections of a pair of hub sections, and means for fastening together the two wheel sections thus formed, whereby a wheel comprising two separable sections, each comprising a rim section and a pair of hub sections and interconnecting means, is formed.

34. A twin wire wheel, comprising two pairs of hub sections, a pair of rim sections, wire spokes interconnecting each rim section with both sections of a pair of hub sections, and means for fastening together the two wheel sections thus formed, whereby a wheel comprising two sections, each comprising a rim section and a pair of hub sections and interconnecting wire spokes, is formed.

35. A twin wire wheel, comprising a pair of hub sections, a pair of rim sections, two sets of wire spokes interconnecting each hub section to the corresponding rim section and oppositely oblique to the wheel axis, means for fastening said wheel sections together, whereby a wheel comprising two separable and completely self-supporting sections, each comprising a hub section and a rim section and interconnecting wire spokes, is formed, and a tire rim firmly clamped in place on said two rim sections when the two wheel sections are fastened together and removable therefrom upon the separation of said wheel sections.

36. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, means for fastening said wheel sections together, and a tire rim firmly clamped in place on said two rim sections when the two wheel sections are fastened together and removable therefrom upon the separation of said wheel sections.

37. A twin wire wheel, comprising a pair of hub sections, a pair of rim sections, two sets of wire spokes interconnecting each hub section to the corresponding rim section and oppositely oblique to the wheel axis, means for fastening said wheel sections together, whereby a wheel comprising two separable and completely self-supporting sections, each comprising a hub section and a rim section and interconnecting wire spokes, is formed, a tire rim firmly clamped in place on said two rim sections when the two wheel sections are fastened together and removable therefrom upon the separation of said wheel sections, and a central supporting member, said central supporting member and a hub section having interfitting portions to prevent relative turning.

38. A twin wheel, comprising two pairs of hub sections, a pair of rim sections, means interconnecting each rim section with both sections of a pair of hub sections, means for fastening together the two wheel sections thus formed, whereby a wheel comprising two separable sections, each comprising a rim section and a pair of hub sections and interconnecting means, is formed, and a tire rim detachably mounted on said rim sections, said tire rim having inwardly projecting members for locking it against relative rotation on the rim sections when the wheel sections are fastened together.

39. A twin wheel, comprising two pairs of hub sections, a pair of rim sections, means interconnecting each rim section with both sections of a pair of hub sections, means for fastening together the two wheel sections thus formed, whereby a wheel comprising two separable sections, each comprising a rim section and a pair of hub sections and interconnecting means, is formed, and a tire firmly clamped in place on said two rim sections when the two wheel sections are clamped together and removable therefrom upon the separation of said wheel sections.

40. A twin wheel, comprising two pairs of hub sections, a pair of rim sections, means interconnecting each rim section with both sections of a pair of hub sections, means for fastening together the two wheel sections thus formed, whereby a wheel comprising two separable sections, each comprising a rim section and a pair of hub sections and interconnecting means, is formed, and a tire rim firmly clamped in place on said two rim sections when the two wheel sections are clamped together and removable therefrom upon the separation of said wheel sections, said tire rim and said rim sections having interlocking parts which prevent relative movement between them when the wheel sections are clamped together.

41. A twin wire wheel, comprising a pair of hub sections, a pair of rim sections, wire spokes interconnecting the hub sections with the respective rim sections, means for fastening said wheel sections together, whereby a wheel comprising two sections, each comprising a hub section and a rim section and interconnecting wire spokes, is formed, and a tire rim detachably mounted on said rim sections, said tire rim having inwardly projecting members for locking it against relative rotation on the rim sections when the wheel sections are fastened together.

42. A twin wheel, comprising a pair of hub sections, a pair of rim sections, means interconnecting each hub section to the corresponding rim section and having two parts which extend from hub section to rim section at oppositely oblique angles to the wheel axis, thus forming two separable completely self-supporting wheel sections each braced against thrust in both directions, means for fastening said wheel sections together, a tread member mounted on said two rim sections jointly, and a central supporting member on which said two hub sections are detachably mounted, said fastening means being independent of said central supporting member.

43. A twin wire wheel, comprising two wheel sections, and a central self-contained member on which said two wheel sections are supported, said central member having outwardly projecting teeth; and each of said wheel sections comprising a sleeve mounted on said central member, a second sleeve mounted on said first sleeve, a wheel rim, and wire spokes interconnecting said wheel rim with both said sleeves; a sleeve of a wheel section having teeth which interlock with the teeth on the central member.

44. A twin wire wheel, comprising two wire wheel sections each comprising a hub, a felly, and wire spokes interconnecting the hub with the felly to hold them relatively rigid independently of the other wheel section; means for fastening the fellies of said two wheel sections together; and a central supporting member on which said two wire wheel sections are detachably mounted.

45. A twin wire wheel, comprising two wire wheel sections each comprising a hub, a felly, and wire spokes interconnecting the hub with the felly to hold them relatively rigid independently of the other wheel section; means for fastening the fellies of said two wheel sections together; a central supporting member on which said two wire wheel sections are detachably mounted; and a tire rim mounted on the fellies of said two wheel sections and detachable therefrom by the separation of the two wheel sections.

46. A wire spoked wheel unit, comprising an inner member, two self-contained wire wheels having fellies and hollow hubs detachably sleeved on said inner member, means for retaining said two hubs on said inner member, a tire rim having inwardly projecting lugs detachably fastened between said fellies, and means for clamping said fellies together.

47. A wire spoked wheel unit, comprising a central member having outwardly projecting teeth; two self-contained wire wheels, each wheel having a felly and a hollow hub, one of said hubs being detachably mounted on said central member and having a brake drum attached and being provided with inwardly projecting teeth interlocking with the teeth on said central member; means for retaining said two wheels on said central member; a tire rim detachably fastened between said fellies and locked against rotation relative thereto; and means for clamping said fellies together.

48. A central member having outwardly projecting teeth; in combination with two self-contained wire wheels; each such wheel comprising a hub sleeve mounted on a central member, a second hub sleeve mounted on said first hub sleeve and having teeth which interlock with the teeth on the central member, said two hub sleeves having outwardly projecting spoke flanges, a felly, and wire spokes interconnecting said felly with the spoke flanges of both said sleeves; and a brake drum rigid with the second hub sleeve of one of said wheels.

In witness whereof, I have hereunto set my hand at Indianapolis, Indiana, this fifteenth day of May, A. D. one thousand nine hundred and sixteen.

THOMAS J. LINDSAY.